US012462752B2

(12) United States Patent
Cheng

(10) Patent No.: US 12,462,752 B2
(45) Date of Patent: Nov. 4, 2025

(54) PIXEL CIRCUIT, DRIVING METHOD AND DISPLAY APPARATUS

(71) Applicants: Beijing BOE Technology Development Co., Ltd., Beijing (CN); BOE Technology Group Co., Ltd., Beijing (CN)

(72) Inventor: Hongfei Cheng, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/696,947

(22) PCT Filed: Jul. 31, 2023

(86) PCT No.: PCT/CN2023/110168
§ 371 (c)(1),
(2) Date: Mar. 28, 2024

(87) PCT Pub. No.: WO2024/041314
PCT Pub. Date: Feb. 29, 2024

(65) Prior Publication Data

US 2024/0395207 A1 Nov. 28, 2024

(30) Foreign Application Priority Data

Aug. 23, 2022 (CN) ........................ 202211013180.8

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01);
(Continued)

(58) Field of Classification Search
CPC ......... G09G 3/3233; G09G 2300/0819; G09G 2300/0852; G09G 2300/0861;
(Continued)

(56) References Cited

U.S. PATENT DOCUMENTS 10,714,008 B1 * 7/2020 Lu ........................ G09G 3/3233
2011/0193850 A1 * 8/2011 Chung .................. H05B 45/44 345/212
(Continued)

FOREIGN PATENT DOCUMENTS

CN 104008726 A 8/2014
CN 104424894 A 3/2015
(Continued)

OTHER PUBLICATIONS

CN 202211013180.8 second office action dated Oct. 16, 2024.

*Primary Examiner* — Grant Sitta
(74) *Attorney, Agent, or Firm* — IPro, PLLC

(57) ABSTRACT

Provided are a pixel circuit, a driving method and a display apparatus. The pixel circuit includes: a light-emitting device (L); a driving transistor (M0) coupled to the light-emitting device and configured to generate, according to a data voltage, a driving current for driving the light-emitting device to emit light; a distributed capacitor (C1), a first electrode of the distributed capacitor being coupled to a gate of the driving transistor, and a second electrode of the distributed capacitor bring coupled to a first electrode of the driving transistor; an initialization circuit (10) configured to initialize the gate of the driving transistor under control of a signal of a reset signal end (Re); a data compensation circuit (20) configured to input the data voltage under control of a signal of a scanning signal end (Sn) and compensate for a threshold voltage (Vth) of the driving transistor; and a light-emitting control circuit (30).

11 Claims, 7 Drawing Sheets

(52) U.S. Cl.
CPC . *G09G 2300/0861* (2013.01); *G09G 2310/08* (2013.01); *G09G 2320/0223* (2013.01); *G09G 2320/045* (2013.01)

(58) Field of Classification Search
CPC ....... G09G 2310/08; G09G 2320/0223; G09G 2320/045; G09G 3/32; G09G 2310/0264
See application file for complete search history.

(56) References Cited

U.S. PATENT DOCUMENTS

| | | | | |
|---|---|---|---|---|
| 2016/0055797 A1* | 2/2016 | Tan | G09G 3/3258 345/206 |
| 2021/0210016 A1* | 7/2021 | Li | G09G 3/3258 |
| 2024/0161681 A1* | 5/2024 | Liu | G09G 3/3233 |

FOREIGN PATENT DOCUMENTS

| | | | |
|---|---|---|---|
| CN | 104575372 | A | 4/2015 |
| CN | 107230451 | A | 10/2017 |
| CN | 108074529 | A | 5/2018 |
| CN | 109559686 | A | 4/2019 |
| CN | 111009218 | A | 4/2020 |
| CN | 112365837 | A | 2/2021 |
| CN | 112735314 | A | 4/2021 |
| CN | 113674690 | A | 11/2021 |
| CN | 114863865 | A | 8/2022 |
| CN | 115376463 | A | 11/2022 |
| CN | 218849052 | U | 4/2023 |

* cited by examiner

PIXEL CIRCUIT, DRIVING METHOD AND DISPLAY APPARATUS

CROSS REFERENCE TO RELATED APPLICATION

The present disclosure is a national phase entry under 35 U.S.C § 371 of International Application No. PCT/CN2023/110168, filed Jul. 31, 2023, which claims the priority of Chinese patent application No. 202211013180.8, filed with the China National Intellectual Property Administration on Aug. 23, 2022 and entitled "Pixel Circuit, Driving Method and Display Apparatus". The entire contents of which are incorporated herein by reference.

TECHNICAL FIELD

The present disclosure relates to the field of display technology, and in particular to a pixel circuit, a driving method and a display apparatus.

BACKGROUND

A light-emitting device L, such as an organic light emitting diode (OLED), a quantum dot light emitting diode (QLED), a micro light emitting diode (Micro LED), a mini light emitting diode (Mini LED), etc., has the advantages of self-illumination and low energy consumption, and are one of the hot spots in the field of current application research of the display apparatus. Generally, a pixel circuit in the display apparatus is used to drive the light-emitting device L to emit light.

SUMMARY

Embodiments of the present disclosure provide a pixel circuit, including:

- a light-emitting device;
- a driving transistor, coupled to the light-emitting device, and configured to generate a driving current for driving the light-emitting device to emit light according to a data voltage;
- a distributed capacitor, where a first electrode of the distributed capacitor is coupled to a gate of the driving transistor, and a second electrode of the distributed capacitor is coupled to a first electrode of the driving transistor;
- an initialization circuit, configured to initialize the gate of the driving transistor under the control of a signal of a reset signal terminal;
- a data compensation circuit, configured to input the data voltage and compensate a threshold voltage of the driving transistor under the control of a signal of a scan signal terminal; and
- a light-emitting control circuit, configured to, under the control of a signal of a light-emitting control signal terminal, conduct the first electrode of the driving transistor to a first power terminal, and conduct a second electrode of the driving transistor to the light-emitting device, to drive the light-emitting device to emit light.

In some possible embodiments, an anode of the light-emitting device is coupled to a second power terminal and a cathode of the light-emitting device is coupled to the light-emitting control circuit; and a voltage of the first power terminal is smaller than a voltage of the second power terminal.

In some possible embodiments, the initialization circuit includes a first transistor;

- a gate of the first transistor is coupled to the reset signal terminal, a first electrode of the first transistor is coupled to the gate of the driving transistor, and a second electrode of the first transistor is coupled to an initialization signal terminal.

In some possible embodiments, the initialization signal terminal is the same signal terminal as one of the first power terminal and the second power terminal.

In some possible embodiments, the data compensation circuit includes a second transistor, a third transistor and a storage capacitor;

- a gate of the second transistor is coupled to the scan signal terminal, a first electrode of the second transistor is coupled to a data signal terminal, and a second electrode of the second transistor is coupled to the first electrode of the driving transistor;
- a gate of the third transistor is coupled to the scan signal terminal, a first electrode of the third transistor is coupled to the gate of the driving transistor, and a second electrode of the third transistor is coupled to the second electrode of the driving transistor; and
- a first electrode of the storage capacitor is coupled to the gate of the driving transistor, and a second electrode of the storage capacitor is coupled to the first power terminal.

In some possible embodiments, the light-emitting control circuit includes a fourth transistor and a fifth transistor;

- a gate of the fourth transistor is coupled to a light-emitting control signal terminal, a first electrode of the fourth transistor is coupled to the first power terminal, and a second electrode of the fourth transistor is coupled to the first electrode of the driving transistor; and
- a gate of the fifth transistor is coupled to the light-emitting control signal terminal, a first electrode of the fifth transistor is coupled to a cathode of the light-emitting device, and a second electrode of the fifth transistor is coupled to the second electrode of the driving transistor.

In some possible embodiments, the pixel circuit further includes a reset circuit;

- the reset circuit is coupled to a cathode of the light-emitting device, and the reset circuit is configured to reset the cathode of the light-emitting device under the control of the signal of the reset signal terminal.

In some possible embodiments, the reset circuit includes a reset transistor;

- a gate of the reset transistor is coupled to the reset signal terminal, a first electrode of the reset transistor is coupled to the cathode of the light-emitting device, and a second electrode of the reset transistor is coupled to the initialization signal terminal.

Embodiments of the present disclosure provide a display apparatus, including the above pixel circuit.

In some possible embodiments, the display apparatus further includes: a plurality of sub-pixels, a plurality of scan signal lines and a plurality of reset signal lines; the plurality of sub-pixels each include the pixel circuit;

- one of the plurality of scan signal lines is coupled to scan signal terminals of pixel circuits in a row of sub-pixels; and
- one of the plurality of reset signal lines is coupled to reset signals terminal of pixel circuits in a row of sub-pixels.

In some possible embodiments, in every two adjacent rows of sub-pixels, a reset signal line coupled to pixel circuits in a next row of sub-pixels and a scan signal line coupled to pixel circuits in a previous row of sub-pixels are the same signal line.

Embodiments of the present disclosure provide a driving method for driving the above pixel circuit, including: an initialization stage, a data compensation stage and a light-emitting stage;

in the initialization stage, initializing, by the initialization circuit, the gate of the driving transistor under the control of the signal of the reset signal terminal;

in the data compensation stage, inputting, by the data compensation circuit, the data voltage and compensating the threshold voltage of the driving transistor under the control of the signal of the scan signal terminal; and in the light-emitting stage, under the control of the signal of the light-emitting control signal terminal, conducting, by the light-emitting control circuit, the first electrode of the driving transistor to the first power terminal, and conducting the second electrode of the driving transistor to the light-emitting device, to drive the light-emitting device to emit light.

DETAILED DESCRIPTION

Figure 1:
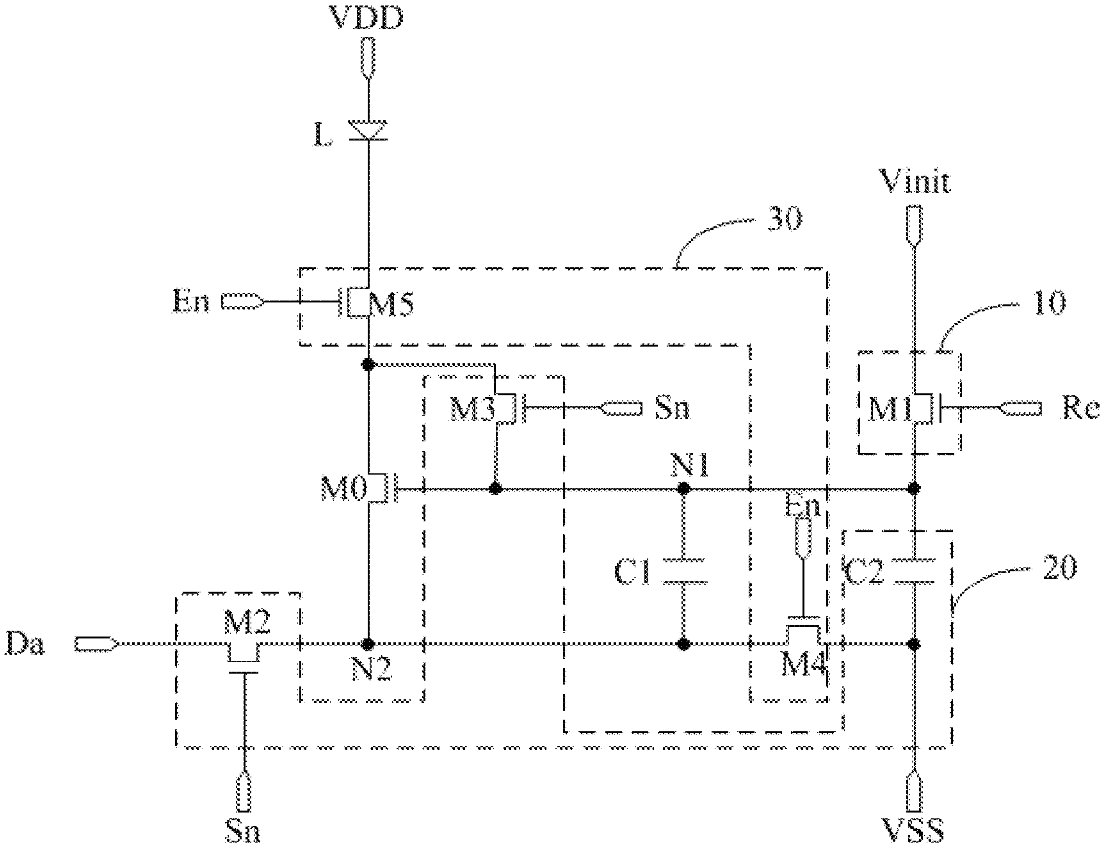
FIG. 1 is a schematic structural diagram of a pixel circuit provided by an embodiment of the present disclosure.

In order to make the purpose, technical solutions and advantages of the embodiments of the present disclosure more clear, the technical solutions of the embodiments of the present disclosure will be clearly and completely described below in conjunction with the drawings of the embodiments of the present disclosure. Obviously, the described embodiments are some, but not all, of the embodiments of the present disclosure. And the embodiments and features in the embodiments of the present disclosure may be combined with each other without conflict. Based on the described embodiments of the present disclosure, all other embodiments obtained by those of ordinary skill in the art without creative efforts fall within the protection scope of the present disclosure.

Unless otherwise defined, technical terms or scientific terms used in the present disclosure shall have the usual meaning understood by a person with ordinary skill in the art to which the present disclosure belongs. "First", "second" and similar words used in the present disclosure do not indicate any order, quantity or importance, but are only used to distinguish different components. Words such as "include" or "comprising" mean that the elements or things appearing before the word include the elements or things listed after the word and their equivalents, without excluding other elements or things. Words such as "connected" or "connection" are not limited to physical or mechanical connections, but may include electrical connections, whether direct or indirect.

It should be noted that the sizes and shapes of the figures in the drawings do not reflect true proportions and are only intended to illustrate the present disclosure. And the same or similar reference numbers throughout represent the same or similar elements or elements with the same or similar functions.

In embodiments of the present disclosure, the pixel circuit as shown in FIG. 1 includes:

a light-emitting device L;

a driving transistor M0, coupled to the light-emitting device L, and configured to generate a driving current for driving the light-emitting device L to emit light according to a data voltage;

a distributed capacitor C1, where a first electrode of the distributed capacitor C1 is coupled to a gate of the driving transistor M0, and a second electrode of the distributed capacitor C1 is coupled to a first electrode of the driving transistor M0;

an initialization circuit 10, configured to initialize the gate of the driving transistor M0 under the control of a signal of a reset signal terminal Re;

a data compensation circuit 20, configured to input the data voltage and compensate a threshold voltage Vth of the driving transistor M0 under the control of a signal of a scan signal terminal Sn; and a light-emitting control circuit 30, configured to, under the control of a signal of a light-emitting control signal terminal En, conduct the first electrode of the driving transistor M0 to a first power terminal VSS and conduct a second electrode of the driving transistor M0 to the light-emitting device L, to drive the light-emitting device L to emit light.

Due to process, aging and other reasons, the threshold voltage Vth of the driving transistor will drift, which will affect the driving current generated thereof, resulting in poor display effects. The pixel circuit provided by the embodiments of the present disclosure compensates the threshold voltage Vth of the driving transistor by increasing the distributed capacitor, thereby outputting a stable driving current and improving the display effect.

In the embodiments of the present disclosure, as shown in FIG. 1, the anode of the light-emitting device L is coupled to a second power terminal VDD, and the cathode of the light-emitting device L is coupled to the light-emitting control circuit 30. For example, the light-emitting device L may be an electroluminescent diode. For example, the light-emitting device L may include at least one of: an organic light emitting diode (OLED), a quantum dot light emitting diode (QLED), a micro light emitting diode (Micro LED), a mini light emitting diode (Mini LED) and so on. For example, the light-emitting device L may include an anode, a light-emitting layer, and a cathode, which are stacked. Furthermore, the light-emitting layer may also include film layers such as a hole injection layer, a hole transport layer, an electron transport layer, and an electron injection layer. Of course, in practical applications, the specific structure of the light-emitting device L can be determined according to the needs of the actual application, and is not limited here.

Moreover, in the embodiments of the present disclosure, the voltage of the first power terminal VSS is smaller than the voltage of the second power terminal VDD. The first power terminal VSS is configured to load a constant first power supply voltage, and the second power terminal VDD is configured to load a constant second power supply voltage. In the embodiment shown in FIG. 1, the first power terminal VSS may be loaded a constant first power supply voltage Vss, and the first power supply voltage Vss is a negative voltage or ground, etc. The second power terminal VDD may be loaded a constant second power supply voltage Vdd, and the second power supply voltage Vdd is a positive voltage. In practical applications, the specific values of the first power supply voltage and the second power supply voltage can be designed and determined according to the actual application environment, and are not limited here.

In the embodiments of the present disclosure, the anode of the light-emitting device L is used as a common electrode, which can reduce the IR Drop of the second power terminal coupled to the light-emitting device, thereby reducing the electrical load, reducing linear loss, and improving the display effect. For example, the anode of the light-emitting device is made of materials with relatively good electrical conductivity, such as aluminum, gold, indium tin oxide (ITO) alloy, etc.

In the embodiments of the present disclosure, as shown in FIG. 1, the driving transistor M0 may be configured as an N-type transistor. Here, the first electrode of the driving transistor M0 may be its source, and the second electrode of the driving transistor M0 may be its drain. When the driving transistor M0 is in a saturation state, and the current flows from the drain of the driving transistor M0 to its source. Of course, the driving transistor M0 may also be set as a P-type transistor, which is not limited here.

Furthermore, the light-emitting device L generally emits light under the action of the current when the driving transistor M0 is in a saturation state. Of course, in the embodiments of the present disclosure, the driving transistor M0 is an N-type transistor as an example. For the case where the driving transistor M0 is a P-type transistor, the design principle is the same as that of the present disclosure, which also falls within the protection scope of the present disclosure.

In the embodiments of the present disclosure, as shown in FIG. 1, the initialization circuit 10 includes a first transistor M1.

A gate of the first transistor M1 is coupled to the reset signal terminal Re, a first electrode of the first transistor M1 is coupled to the gate of the driving transistor M0, and a second electrode of the first transistor M1 is coupled to the initialization signal terminal Vinit.

For example, the first transistor M1 may be turned on under the control of the active level of the reset signal transmitted from the reset signal terminal Re, and may be turned off under the control of the inactive level of the reset signal. For example, the first transistor M1 can be set as an N-type transistor, then the active level of the reset signal is a high level and the inactive level of the reset signal is a low level. Alternatively, the first transistor M1 can be set as a P-type transistor, so that the active level of the reset signal is a low level and the inactive level of the reset signal is a high level.

Here, the first transistor M1 may be configured as an N-type transistor. The first electrode of the first transistor M1 serves as its source, and the second electrode of the first transistor M1 serves as its drain, or the first electrode of the first transistor M1 serves as its drain, and the second electrode of the first transistor M1 serves as its source. Of course, the first transistor M1 can also be configured as a P-type transistor, which is not limited here.

In the embodiments of the present disclosure, as shown in FIG. 1, the data compensation circuit 20 includes a second transistor M2, a third transistor M3, and a storage capacitor C2; a gate of the second transistor M2 is coupled to the scan signal terminal Sn, and a first electrode of the second transistor M2 is connected to a data signal terminal Da, a second electrode of the second transistor M2 is coupled to the first electrode of the driving transistor M0; a gate of the third transistor M3 is coupled to the scan signal terminal Sn, a first electrode of the third transistor M3 is coupled to the gate of the driving transistor M0, a second electrode of the third transistor M3 is coupled to the second electrode of the driving transistor M0; a first electrode of the storage capacitor C2 is coupled to the gate of the driving transistor M0, and a second electrode of the storage capacitor C2 is coupled to the first power terminal VSS.

For example, the second transistor M2 and the third transistor M3 may be turned on under the control of the active level of the scan signal transmitted from the scan signal terminal Sn, and may be turned off under the control of the inactive level of the scan signal. For example, the second transistor M2 and the third transistor M3 can be configured as N-type transistors, then the active level of the scan signal is a high level, and the inactive level of the scan signal is a low level. Alternatively, the second transistor M2 and the third transistor M3 may also be configured as P-type transistors, so that the active level of the scan signal is a low level and the inactive level of the scan signal is a high level.

Here, the second transistor M2 and the third transistor M3 may be configured as N-type transistors. The first electrodes of the second transistor M2 and the third transistor M3 serve as their sources, and the second electrodes of the second transistor M2 and the third transistor M3 serve as their drains, or the first electrodes of the second transistor M2 and the third transistor M3 serve as their drains, and the second electrodes of the second transistor M2 and the third transistor M3 serve as their sources. Of course, the second transistor M2 and the third transistor M3 can also be configured as P-type transistors, which is not limited here.

In the embodiments of the present disclosure, as shown in FIG. 1, the light-emitting control circuit 30 includes a fourth transistor M4 and a fifth transistor M5. A gate of the fourth transistor M4 is coupled to the light-emitting control signal terminal En, and a first electrode of the fourth transistor M4 is coupled to the first power terminal VSS, and a second electrode of the fourth transistor M4 is coupled to the first electrode of the driving transistor M0; a gate of the fifth transistor M5 is coupled to the light-emitting control signal terminal En, and a first electrode of the fifth transistor M5 is coupled to the cathode of the light-emitting device L, and a second electrode of the fifth transistor M5 is coupled to the second electrode of the driving transistor M0.

For example, the fourth transistor M4 and the fifth transistor M5 may be turned on under the control of the active level of the light-emitting control signal transmitted from the light-emitting control signal terminal En, and may be turned off under the control of the inactive level of the light-emitting control signal. For example, the fourth transistor M4 and the fifth transistor M5 can be set as N-type transistors, then the active level of the light-emitting control signal is a high level, and the inactive level of the light-emitting control signal is a low level. Alternatively, the fourth transistor M4 and the fifth transistor M5 can also be set as P-type transistors, so that the active level of the light-emitting control signal is a low level and the inactive level of the light-emitting control signal is a high level.

Here, the fourth transistor M4 and the fifth transistor M5 may be configured as N-type transistors. The first electrodes of the fourth transistor M4 and the fifth transistor M5 serve as their sources, the second electrodes of the fourth transistor M4 and the fifth transistor M5 serve as their drains, or the first electrodes of the fourth transistor M4 and the fifth transistor M5 serve as their drains, and the second electrodes of the fourth transistor M4 and the fifth transistor M5 serve as their sources. Of course, the fourth transistor M4 and the fifth transistor M5 can also be configured as P-type transistors, which are not limited here.

Generally, the leakage current of a transistor using a metal oxide semiconductor material as the active layer is small. Therefore, in order to reduce the leakage current, in some embodiments of the present disclosure, the material of the active layer of the above transistor may include a metal oxide semiconductor material. For example, it may be indium gallium zinc oxide (IGZO). Of course, it may also be other metal oxide semiconductor materials, which are not limited here. In this way, the above transistors may be configured as oxide thin film transistors, so that the leakage current of the pixel circuit can be reduced.

Generally, transistors that use low temperature polysilicon (LTPS) material as the active layer have high mobility and can be made thinner and smaller, with lower power consumption. In specific implementation, the material of the active layer of the above transistor can also be set to low temperature poly-silicon material. In this way, the above transistors can be set as LTPS-type transistors, so that the pixel circuit can achieve high mobility and can be made thinner and smaller, with lower power consumption, etc.

For example, all the transistors in the pixel circuit of the present disclosure can be configured as oxide transistors, or all the transistors in the pixel circuit of the present disclosure can be configured as LTPS-type transistors, or some of the transistors in the pixel circuit of the present disclosure are configured as oxide transistors, and some of the transistors are configured as LTPS-type transistors. For example, M1 and M3 are set as oxide transistors, and M0, M2, M4, and M5 are set as LTPS-type transistors.

The above are only examples to illustrate the specific structures of each circuit in the pixel circuits provided by the embodiments of the present disclosure. During specific implementation, the specific structure of the above circuit is not limited to the above structures provided by the embodiments of the present disclosure, and may also be other structures known to those skilled in the art, which are all within the protection scope of the present disclosure and are not specifically limited here.

Figure 2:
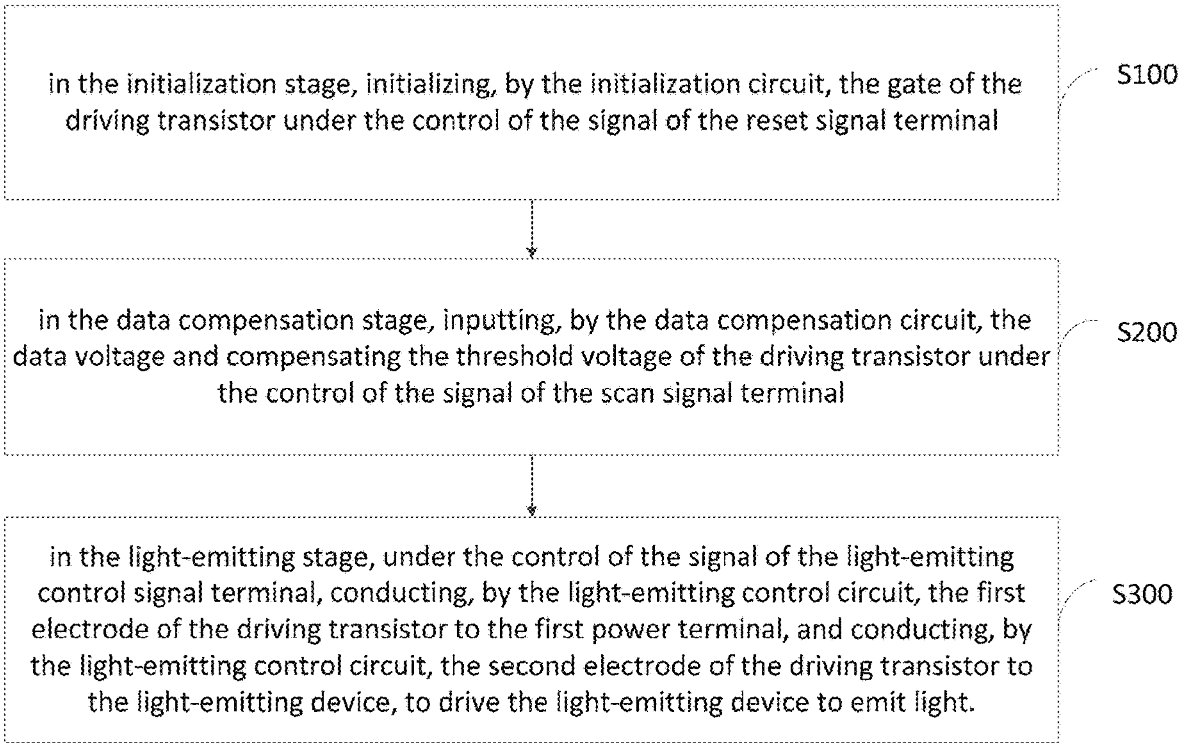
FIG. 2 is a flow chart of a driving method for a pixel circuit provided by an embodiment of the present disclosure.

In embodiments of the present disclosure, as shown in FIG. 2, the embodiments of the present disclosure provide a driving method for driving the pixel circuit, which may include the following steps.

S100, in the initialization stage, initializing, by the initialization circuit, the gate of the driving transistor under the control of the signal of the reset signal terminal.

S200, in the data compensation stage, inputting, by the data compensation circuit, the data voltage and compensating the threshold voltage of the driving transistor under the control of the signal of the scan signal terminal.

S300, in the light-emitting stage, under the control of the signal of the light-emitting control signal terminal, conducting, by the light-emitting control circuit, the first electrode of the driving transistor to the first power terminal, and conducting, by the light-emitting control circuit, the second electrode of the driving transistor to the light-emitting device, to drive the light-emitting device to emit light.

Figure 3:
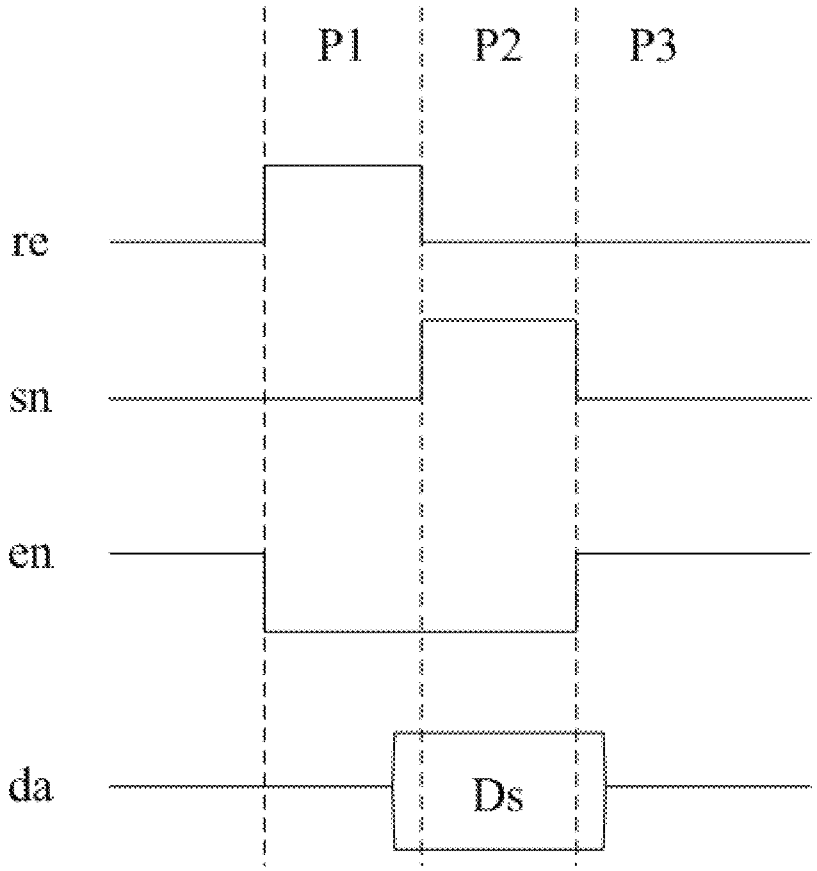
FIG. 3 is some signal timing diagrams provided by embodiments of the present disclosure.

The following takes the pixel circuit shown in FIG. 1 as an example and combines the signal timing diagram shown in FIG. 3 to describe the working process of the pixel circuit provided by the embodiments of the present disclosure.

Here, as shown in FIG. 3, re represents the reset signal of the reset signal terminal Re, sn represents the scan signal of the scan signal terminal Sn, and en represents the light-emitting control signal of the light-emitting control signal terminal En.

Furthermore, the initialization stage P1, the data compensation stage P2 and the light-emitting stage P3 in one display frame are selected.

In the initialization stage P1, the first transistor M1 is turned on under the control of the high level of the reset signal re. The second transistor M2 and the third transistor M3 are turned off under the control of the low level of the scan signal sn. The fourth transistor M4 and the fifth transistor M5 are turned off under the control of the low level of the light-emitting control signal en. The first transistor M1 that is turned on inputs the initialization signal of the initialization signal terminal Vinit to the gate of the driving transistor M0 to initialize the gate of the driving transistor M0. At this time, the potential VN1 of the node N1 is the voltage Vi of the initialization signal.

In the data compensation stage P2, the first transistor M1 is turned off under the control of the low level of the reset signal re. The second transistor M2 and the third transistor M3 are turned on under the control of the high level of the scan signal sn. The fourth transistor M4 and the fifth transistor M5 are turned off under the control of the low level of the light-emitting control signal en. The second transistor M2 that is turned on inputs the data voltage Vda of the data signal terminal Da into the first electrode of the driving transistor M0. At this time, the potential of the node N2 satisfies VN2=Vda. Since the third transistor M3 that is turned on can cause the driving transistor M0 to form a diode connection manner, the data voltage Vda input to the first electrode of the driving transistor M0 can pass through the driving transistor M0 forming the diode connection manner and be input to the gate of the driving transistor M0, to compensate the threshold voltage Vth of the driving transistor M0, so that the gate voltage of the driving transistor M0 is Vda+Vth. Furthermore, when the potential of the node N1 satisfies VN1=Vda+Vth, the driving transistor M0 is turned off.

In the light-emitting stage P3, the first transistor M1 is turned off under the control of the low level of the reset signal re. The second transistor M2 and the third transistor M3 are turned off under the control of the low level of the scan signal sn. The fourth transistor M4 and the fifth transistor M5 are turned on under the control of the high level of the light-emitting control signal en. The fourth transistor M4 that is turned on brings the first electrode of the driving transistor M0 into conduction with the first power terminal VSS, and the fifth transistor M5 that is turned on brings the second electrode of the driving transistor M0 into conduction with the cathode of the light-emitting device L, to drive the light-emitting device L to emit light. At this time, the potential of the node N2 satisfies VN2=Vss, and the change amount of the potential VN2 of the node N2 relative to the data compensation stage P2 is Vss-Vda. The potential of the node N1 is VN1=Vda+Vth+[C1/(C1+C2)](Vss−Vda). At this time, the voltage of the gate of the driving transistor relative to its source is Vgs=VN1−VN2, the driving transistor M0 is in a saturation state, and the current that drives the light-emitting device to emit light is $I_{DS}$, and $$I_{DS}=\frac{1}{2}\mu C_{OX}\frac{W}{L}(V_{gs}-V_{th})^2=\frac{1}{2}\mu C_{OX}\frac{W}{L}\times\frac{C2}{C1+C2}(Vda-Vss)^2.$$

It should be noted that the electric charge of the gate of the driving transistor M0 is stored in the distributed capacitor C1 and the storage capacitor C2, and a stable $I_{DS}$ can be obtained. This $I_{DS}$ is independent of the threshold voltage Vth of the driving transistor M0.

Figure 4:
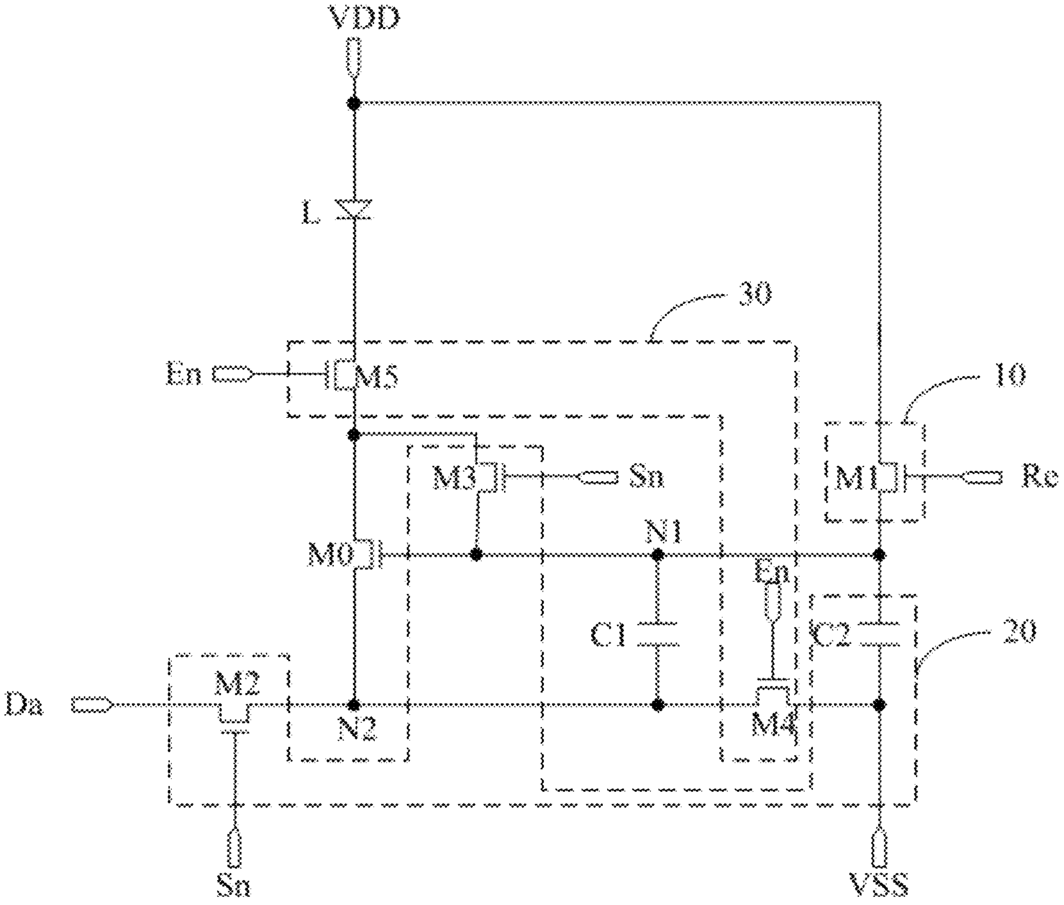
FIG. 4 is another schematic structural diagram of a pixel circuit provided by an embodiment of the present disclosure.

Embodiments of the present disclosure provide other schematic structural diagrams of pixel circuits, as shown in FIG. 4, which are modified from the implementation in the above embodiments. Only the differences between this embodiment and the above-mentioned embodiments will be described below, and the similarities will not be described again.

In the embodiments of the present disclosure, the initialization signal terminal Vinit and the second power terminal VDD can be the same signal terminal. For example, as shown in FIG. 4, the first electrode of the first transistor M1 is coupled to the second power terminal VDD. Of course, the initialization signal terminal and the first power terminal can also be the same signal terminal. For example, the first electrode of the first transistor is coupled to the first power terminal, which is not limited here.

The signal timing diagram corresponding to the pixel circuit shown in FIG. 4 is shown in FIG. 3. In the initialization stage P1, the first transistor M1 that is turned on inputs the second power supply voltage Vdd of the second power terminal VDD into the gate of the driving transistor M0, to initialize the gate of the driving transistor M0. At this time, the potential VN1 of the node N1 is the second power supply voltage Vdd. For the rest of the working process, the above description may be referred and will not be repeated here.

Figure 5:
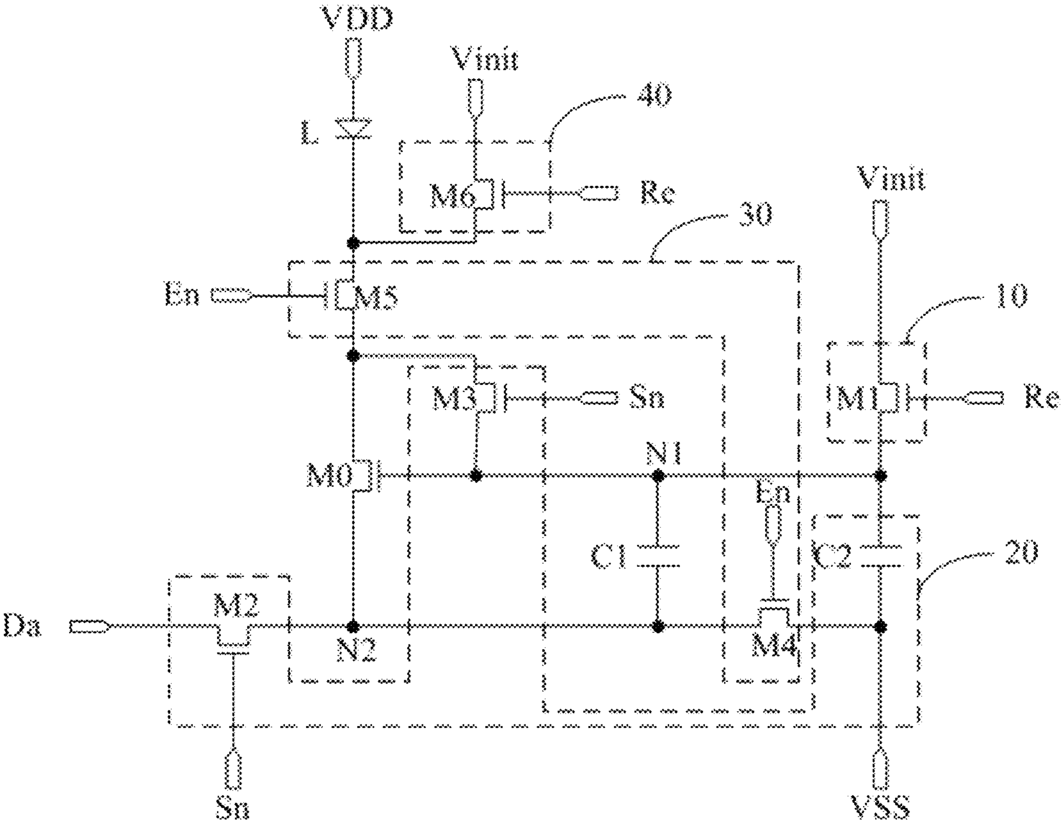
FIG. 5 is another schematic structural diagram of a pixel circuit provided by an embodiment of the present disclosure.

Embodiments of the present disclosure provide further another schematic structural diagram of pixel circuits, as shown in FIG. 5, which are modified from the implementation in the above embodiments. Only the differences between this embodiment and the above-mentioned embodiments will be described below, and the similarities will not be described again.

In the embodiments of the present disclosure, as shown in FIG. 5, the pixel circuit further includes a reset circuit 40; the reset circuit 40 is coupled to the cathode of the light-emitting device L, and the reset circuit 40 is configured to reset the cathode of the light-emitting device L under the control of the signal of the reset signal terminal Re.

In the embodiments of the present disclosure, as shown in FIG. 5, the reset circuit includes a reset transistor M6; a gate of the reset transistor M6 is coupled to the reset signal terminal Re, and a first electrode of the reset transistor M6 is coupled to the cathode of the light-emitting device L, and a second electrode of the reset transistor M6 is coupled to the initialization signal terminal Vinit.

For example, the reset transistor M6 may be turned on under the control of the active level of the reset signal transmitted on the reset signal terminal Re, and may be turned off under the control of the inactive level of the reset signal. For example, the reset transistor M6 can be set as an N-type transistor, then the active level of the reset signal is a high level and the inactive level of the reset signal is a low level. Alternatively, the reset transistor M6 can be set as a P-type transistor, then the active level of the reset signal is a low level and the inactive level of the reset signal is a high level.

Here, the reset transistor M6 can be set as an N-type transistor. The first electrode of the reset transistor M6 serves as its source, and the second electrode of the reset transistor M6 serves as its drain, or the first electrode of the reset transistor M6 serves as its drain, and the second electrode of the reset transistor M6 serves as its source. Of course, the reset transistor M6 can also be set as a P-type transistor, which is not limited here.

For example, when the initialization signal terminal and the second power terminal are the same signal terminal, the second electrode of the reset transistor is also coupled to the second power terminal. Alternatively, when the initialization signal terminal and the first power terminal are the same signal terminal, the second electrode of the reset transistor is also coupled to the first power terminal.

The signal timing diagram corresponding to the pixel circuit shown in FIG. 5 is shown in FIG. 3. In the initialization stage P1, the reset transistor M6 is also turned on under the control of the high level of the reset signal re. The reset transistor M6 that is turned on inputs the initialization signal of the initialization signal terminal Vinit into the cathode of the light-emitting device, to reset the cathode of the light-emitting device L. For the rest of the working process, the above description may be referred and will not be repeated here.

Figure 6:
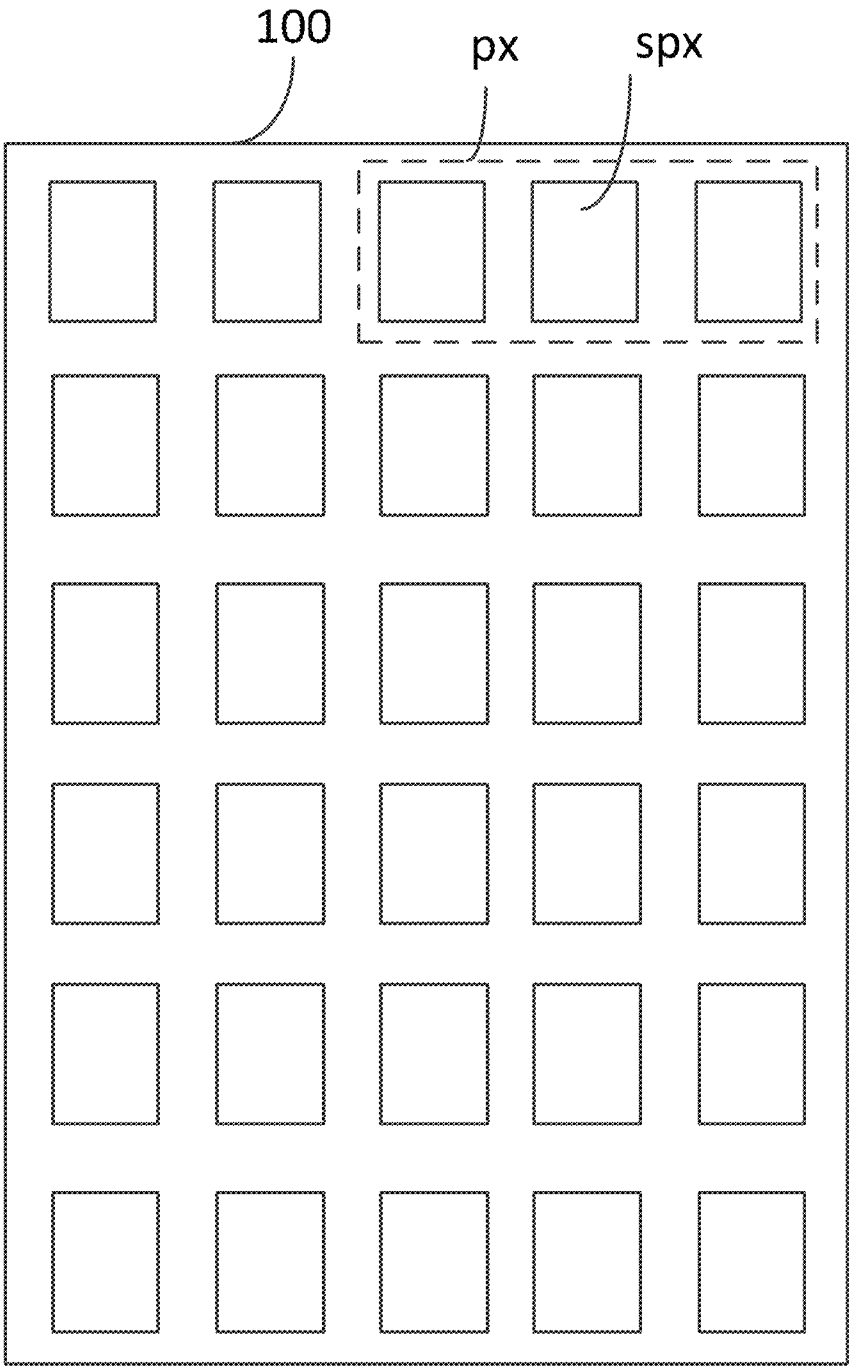
FIG. 6 is a schematic structural diagram of a display apparatus provided by an embodiment of the present disclosure.

Embodiments of the present disclosure further provide a display apparatus. As shown in FIG. 6, the display apparatus includes: a display panel 100. A display area of the display panel 100 includes a plurality of pixel units PX arranged in an array. The pixel units PX may include a plurality of sub-pixels spx. Exemplarily, each pixel unit includes a plurality of sub-pixels spx. For example, the pixel unit may include a red sub-pixel(s), a green sub-pixel(s) and a blue sub-pixel(s), so that red, green and blue colors can be mixed to achieve color display. Alternatively, the pixel unit may also include a red sub-pixel(s), a green sub-pixel(s), a blue sub-pixel(s) and a white sub-pixel(s), so that the colors of red, green, blue and white can be mixed to achieve color display. Of course, in actual applications, the luminous color of the sub-pixels in the pixel unit can be designed and determined according to the actual application environment, and is not limited here.

In the embodiments of the present disclosure, each sub-pixel spx in the display apparatus provided by the embodiments of the present disclosure includes the above-mentioned pixel circuit. Here, the display apparatus further includes: a plurality of scan signal lines and a plurality of reset signal lines; one of the plurality of scan signal lines is coupled to the scan signal terminals Sn of the pixel circuits in a row of sub-pixels spx; and one of the plurality of reset signal lines is coupled to the reset signal terminals Re of the pixel circuits in one row of sub-pixels spx.

For example, one scan signal line can be provided corresponding to one row of sub-pixels spx, and one reset signal line can be provided corresponding to one row of sub-pixels spx, that is, one row of sub-pixels spx corresponds to one scan signal line and one reset signal line.

Figure 7:
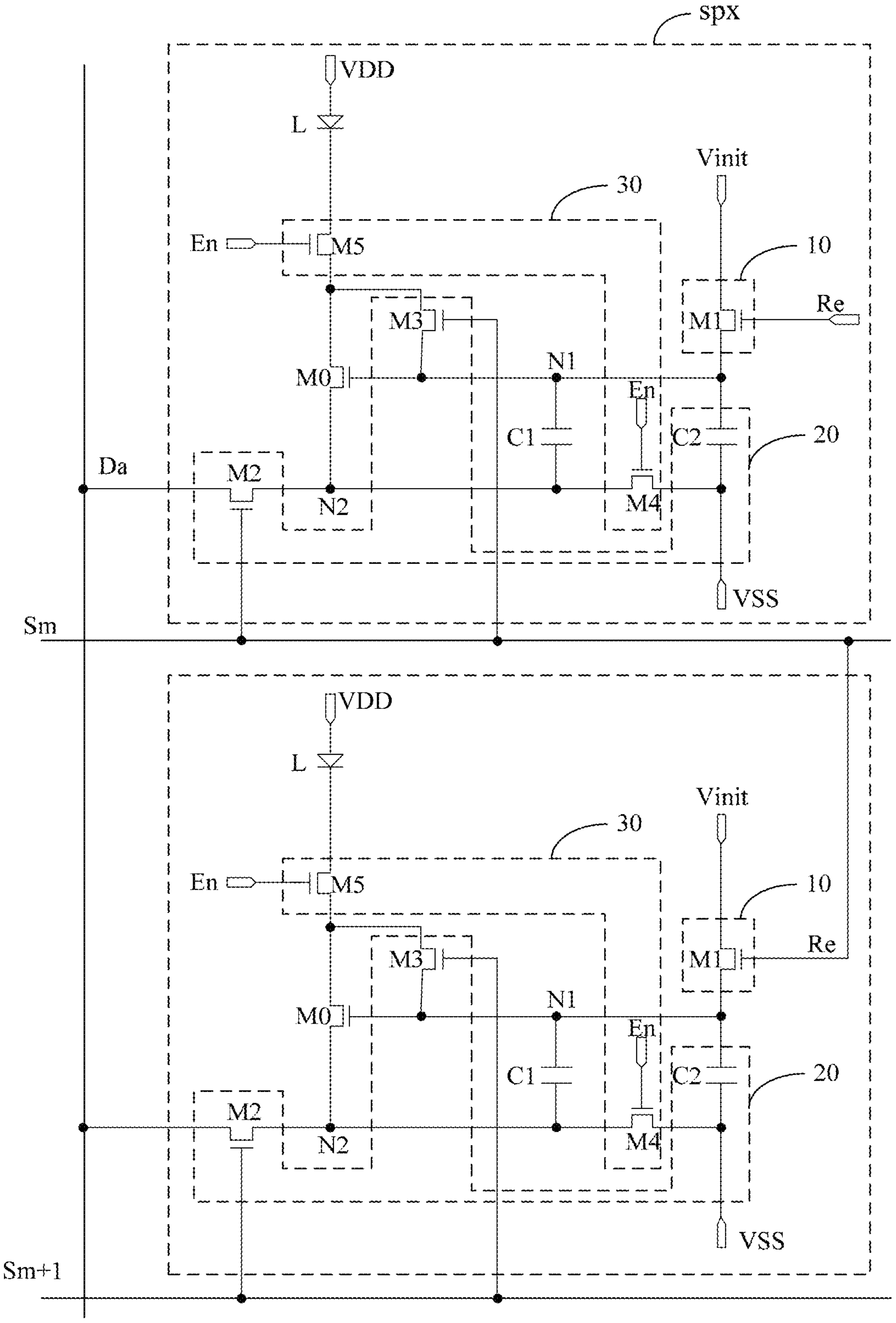
FIG. 7 is another schematic structural diagram of a display apparatus provided by an embodiment of the present disclosure.

For example, the scan signal line and the reset signal line may be shared. For example, as shown in FIG. 7, in every two adjacent rows of sub-pixels spx, the reset signal line coupled to the pixel circuits in the next row of sub-pixels spx and the scan signal line coupled to the pixel circuits in the previous row of sub-pixels are the same signal line. That is, each sub-pixel corresponds to one scan signal line. The scan signal line Sm corresponding to the first row of sub-pixels can be coupled to the reset signal terminals Re of the pixel circuits in the second row of sub-pixels. The scan signal line corresponding to the second row of sub-pixels can be coupled to the reset signal terminals Re of the pixel circuits in the third row of sub-pixels. The scan signal line corresponding to the third row of sub-pixels can be coupled to the reset signal terminals Re of the pixel circuits in the fourth row of sub-pixels.

Embodiments of the present disclosure further provide a display apparatus, including the above display panel provided by the embodiments of the present disclosure. The principle of solving the problem of the display apparatus is similar to that of the foregoing display panel. Therefore, the implementation of the display apparatus can be referred to the implementation of the foregoing display panel, and the overlapping parts will not be described again.

In specific implementation, in the embodiments of the present disclosure, the display apparatus may be: a mobile phone, a tablet computer, a television, a monitor, a notebook computer, a digital photo frame, a navigator, or any other product or component with a display function. Other essential components of the display apparatus are understood by those of ordinary skill in the art, and will not be described in detail here, nor should they be used to limit the present disclosure.

Although the preferred embodiments of the present disclosure have been described, those skilled in the art will be able to make additional changes and modifications to these embodiments once the basic inventive concepts are apparent. Therefore, it is intended that the appended claims be construed to include the preferred embodiments and all changes and modifications that fall within the scope of the present disclosure.

Obviously, those skilled in the art can make various changes and modifications to the embodiments of the present disclosure without departing from the spirit and scope of the embodiments of the present disclosure. In this way, if these modifications and variations of the embodiments of the present disclosure fall within the scope of the claims of the present disclosure and equivalent technologies, the present disclosure is also intended to include these modifications and variations.

What is claimed is:

1. A pixel circuit, comprising:

a light-emitting device;

a driving transistor, coupled to the light-emitting device, and configured to generate a driving current for driving the light-emitting device to emit light according to a data voltage;

a distributed capacitor, wherein a first electrode of the distributed capacitor is coupled to a gate of the driving transistor, and a second electrode of the distributed capacitor is coupled to a first electrode of the driving transistor;

an initialization circuit, configured to initialize the gate of the driving transistor under control of a signal of a reset signal terminal;

a data compensation circuit, configured to input the data voltage and compensate a threshold voltage of the driving transistor under control of a signal of a scan signal terminal; and a light-emitting control circuit, configured to, under control of a signal of a light-emitting control signal terminal, conduct the first electrode of the driving transistor to a first power terminal, and conduct a second electrode of the driving transistor to the light-emitting device, to drive the light-emitting device to emit light;

wherein the data compensation circuit comprises a second transistor, a third transistor and a storage capacitor;

a gate of the second transistor is coupled to the scan signal terminal, a first electrode of the second transistor is coupled to a data signal terminal, and a second electrode of the second transistor is coupled to the first electrode of the driving transistor;

a gate of the third transistor is coupled to the scan signal terminal, a first electrode of the third transistor is coupled to the gate of the driving transistor, and a second electrode of the third transistor is coupled to the second electrode of the driving transistor; and a first electrode of the storage capacitor is coupled to the gate of the driving transistor, and a second electrode of the storage capacitor is directly coupled to the first power terminal.

2. The pixel circuit according to claim 1, wherein an anode of the light-emitting device is coupled to a second power terminal and a cathode of the light-emitting device is coupled to the light-emitting control circuit; and a voltage of the first power terminal is smaller than a voltage of the second power terminal.

3. The pixel circuit according to claim 1, wherein the initialization circuit comprises a first transistor;

a gate of the first transistor is coupled to the reset signal terminal, a first electrode of the first transistor is coupled to the gate of the driving transistor, and a second electrode of the first transistor is coupled to an initialization signal terminal.

4. The pixel circuit according to claim 3, wherein the initialization signal terminal is a same signal terminal as one of the first power terminal and the second power terminal.

5. The pixel circuit according to claim 1, wherein the light-emitting control circuit comprises a fourth transistor and a fifth transistor;

a gate of the fourth transistor is coupled to a light-emitting control signal terminal, a first electrode of the fourth transistor is coupled to the first power terminal, and a second electrode of the fourth transistor is coupled to the first electrode of the driving transistor; and a gate of the fifth transistor is coupled to the light-emitting control signal terminal, a first electrode of the fifth transistor is coupled to a cathode of the light-emitting device, and a second electrode of the fifth transistor is coupled to the second electrode of the driving transistor.

6. The pixel circuit according to claim 1, further comprising a reset circuit; wherein the reset circuit is coupled to a cathode of the light-emitting device, and the reset circuit is configured to reset the cathode of the light-emitting device under control of the signal of the reset signal terminal.

7. The pixel circuit according to claim 6, wherein the reset circuit comprises a reset transistor;

a gate of the reset transistor is coupled to the reset signal terminal, a first electrode of the reset transistor is coupled to the cathode of the light-emitting device, and a second electrode of the reset transistor is coupled to the initialization signal terminal.

8. A display apparatus, comprising the pixel circuit according to claim 1.

9. The display apparatus according to claim 8, comprising: a plurality of sub-pixels, a plurality of scan signal lines and a plurality of reset signal lines; the plurality of sub-pixels each comprise the pixel circuit;

one of the plurality of scan signal lines is coupled to scan signal terminals of pixel circuits in a row of sub-pixels; and one of the plurality of reset signal lines is coupled to reset signal terminals of pixel circuits in a row of sub-pixels.

10. The display apparatus according to claim 9, wherein in every two adjacent rows of sub-pixels, a reset signal line coupled to pixel circuits in a next row of sub-pixels and a scan signal line coupled to pixel circuits in a previous row of sub-pixels are a same signal line.

11. A driving method for driving the pixel circuit according to claim 1, comprising: an initialization stage, a data compensation stage and a light-emitting stage;

in the initialization stage, initializing, by the initialization circuit, the gate of the driving transistor under the control of the signal of the reset signal terminal;

in the data compensation stage, inputting, by the data compensation circuit, the data voltage and compensating the threshold voltage of the driving transistor under the control of the signal of the scan signal terminal; and in the light-emitting stage, under the control of the signal of the light-emitting control signal terminal, conducting, by the light-emitting control circuit, the first electrode of the driving transistor to the first power terminal, and conducting, by the light-emitting control circuit, the second electrode of the driving transistor to the light-emitting device, to drive the light-emitting device to emit light.

* * * * *